June 15, 1943.   J. CANETTA ET AL   2,321,992
APPARATUS FOR DETECTING RATE OF CHANGE OF SPEED
Original Filed Aug. 15, 1940   2 Sheets-Sheet 1

INVENTORS
JOHN. CANETTA
PAUL N. BOSSART
BY
ATTORNEY

June 15, 1943.  J. CANETTA ET AL  2,321,992
APPARATUS FOR DETECTING RATE OF CHANGE OF SPEED
Original Filed Aug. 15, 1940    2 Sheets-Sheet 2

INVENTORS
JOHN CANETTA
PAUL N. BOSSART
BY
ATTORNEY

Patented June 15, 1943

2,321,992

UNITED STATES PATENT OFFICE 2,321,992

APPARATUS FOR DETECTING RATE OF CHANGE OF SPEED

John Canetta, Wilkinsburg, and Paul N. Bossart, Cheswick, Pa., assignors to The Westinghouse Air Brake Company, Wilmerding, Pa., a corporation of Pennsylvania Original application August 15, 1940, Serial No. 352,770. Divided and this application January 30, 1941, Serial No. 376,599

9 Claims. (Cl. 175—183)

This invention relates to apparatus for detecting rate of change of speed of an element and particularly the rate of change of rotational speed of a rotary element, this application being a division of our prior application, now Patent 2,270,414.

Our present invention is adapted to detect a rate of change of speed of a rotary element in excess of a certain rate and operate for a desired purpose such as alteration of the rotative condition of the rotary element. Various uses of our invention will occur to those skilled in the art but for illustrative purposes our invention is shown and described in connection with a fluid pressure brake equipment for railway cars and trains in order to release the brakes on a slipping wheel to prevent sliding of the wheel.

As is well known, if the degree of application of the brakes associated with a vehicle wheel becomes sufficient to exceed the limit of adhesion or rolling friction between the wheel and the rail or road surface on which it rolls, the wheel decelerates promptly at an abnormally rapid rate to a locked or non-rotative condition and slides. Sliding of railway car wheels is objectionable because it develops flat spots on the wheels, thereby necessitating replacement or repair of the wheels.

In the subsequent description of our invention, the term "slide" refers only to the dragging of a wheel along the rail or road surface in a locked condition. The rotation of a vehicle wheel at a speed less than a speed corresponding to vehicle speed at a given instant is referred to as "slip" or a "slipping condition." The distinction between the terms "slide" and "slip" should accordingly be borne in mind.

Under the most favorable conditions of adhesion or rolling friction between a wheel and the rail on which it rolls, a certain maximum rate of rotative deceleration of the wheel due to braking is possible without causing the wheels to slip. The rotative deceleration of a wheel at a rate exceeding a certain high rate, which is never attained while the wheel is not slipping, is therefore positive indication of a slipping condition. It has heretofore been proposed to provide various types of devices, either mechanical or electrical in nature, responsive to the rate of rotative deceleration of a vehicle wheel for automatically and instantly effecting a rapid reduction in the degree of application of the brakes associated with a wheel when the wheel begins to rotatively decelerate at a slipping rate. This automatic and instantaneous rapid reduction in the degree of application of the brakes associated with a slipping wheel causes the wheel to cease decelerating and begin to accelerate back toward a speed corresponding to vehicle speed, without actually decelerating to a locked or non-rotative condition and sliding.

Up to the present time, the proposed devices which are responsive to the rate of rotative deceleration of a vehicle wheel have been of the "rotary inertia" type or of the "generator" type. Moreover, such devices have been associated directly with the vehicle wheel or the axle connecting a pair of wheels, as by mounting the devices in a separable casing attached to the journal at one end of a wheel axle in place of the usual end cover and in such manner that the rotary element of the devices are in coaxial coupled relation to one end of the wheel axle.

Due to the inherent weight of such devices and the fact that they are subject to the constant shock and vibration due to travel of the vehicle along the rail, the friction and wear on the bearings of the rotatable elements of the devices has been found to be excessively high. Such friction may, if permitted to continue long enough, interfere with the accuracy and sensitivity of the devices to the rate of change of speed of the vehicle wheel and will in any case necessitate undesirably frequent servicing or repair.

It is an object of our invention, therefore, to provide a novel type of apparatus for detecting or registering the rate of change of rotational speed of a rotary element, such as a vehicle wheel, which inherently avoids the difficulties presented by prior devices.

In carrying out the above object, we have utilized apparatus similar in some respects to the apparatus disclosed in the copending application, now Patent 2,270,413, of John Canetta, one of the present joint applicants, which patent is assigned to the same assignee as the present application. In this patent a commutator device is provided which is rotatable according to the rotational speed of a wheel of a vehicle for alternately charging a condenser to the voltage of a substantially constant voltage source and discharging the condenser into a discharge circuit repeatedly in rapid succession so as to produce a pulsating direct-current in the discharge circuit substantially proportional to the rotational speed of the wheel. Our present invention so modifies the discharge circuit of the apparatus shown in Patent 2,270,413 as to cause pick-up of a relay therein only in response to deceleration of the vehicle wheels at a rate exceeding a certain rate occurring, for example, when the wheel slips.

It is another object of our invention to provide apparatus of the character indicated above and further characterized by an arrangement adapted to cause operative response of the relay in the discharge circuit whenever the rotary element rotatively decelerates at a rate exceeding a certain substantially uniform rate notwithstanding variation in the rotational speed of the rotary element over a wide range.

It is another object of our invention to provide apparatus of the type indicated in the foregoing objects and further characterized by an arrangement for compensating for the number of rotary elements employed in a system.

The above objects, and other objects of our invention which will be made apparent hereinafter, are attained by several embodiments of our invention subsequently to be described and shown in the accompanying drawings wherein.

Figure 1:
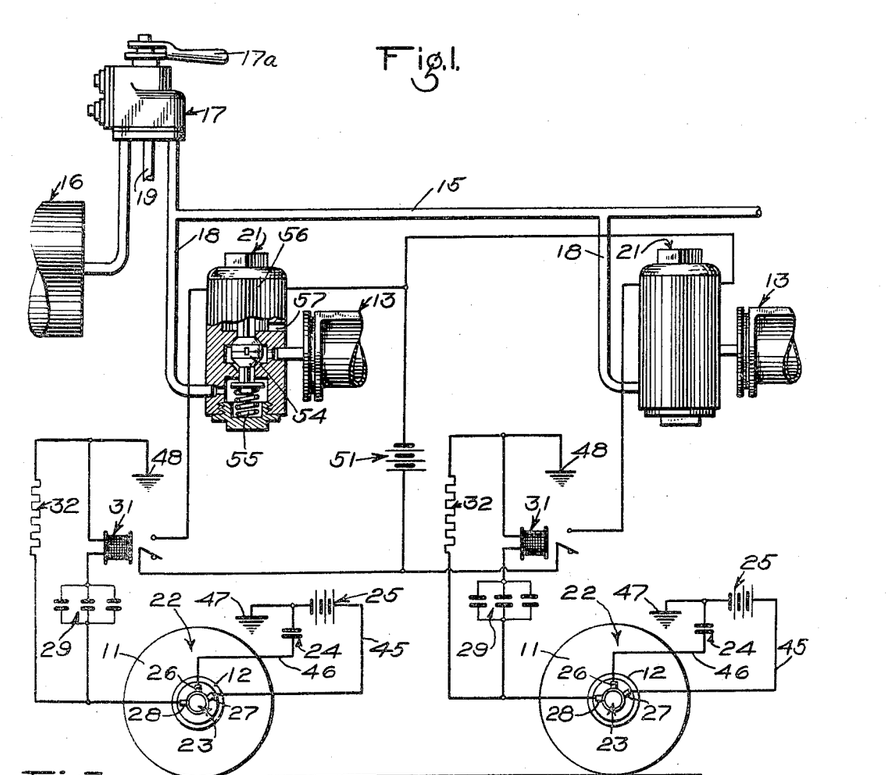
Fig. 1 is a diagrammatic view illustrating the principal object of our invention as applied to two separate wheel units of a car, as for example the two wheel units of a four-wheel truck.

*Description of equipment shown in Fig. 1*

Referring to Fig. 1, the equipment shown is illustrated as applied to a four-wheel truck having a pair of wheel units 11 and 7, each unit comprising two wheels, only one of which is shown, connected by and fixed at opposite ends to an axle 12 in well-known manner. For convenience and simplicity, details of the truck structure are omitted. Similarly, the brake shoes associated with the wheels and the brake operating lever mechanism or brake rigging therefor have been omitted, it being understood that the brakes may be of the conventional clasp shoe type applied by supplying fluid under pressure to brake cylinders 13 and released by releasing fluid under pressure therefrom.

The supply of fluid under pressure to the brake cylinders 13 and the release of fluid under pressure therefrom may be effected under the control of the operator of the vehicle by any suitable and well-known type of fluid pressure brake control apparatus. For simplicity, the operator-controlled apparatus is illustrated as comprising a train pipe 15, hereinafter called the control pipe, which may extend from car to car throughout a train, the sections on successive cars being connected by suitable hose couplers (not shown) in conventional manner; a reservoir 16, hereinafter referred to as the main reservoir, which is maintained charged at a suitable fluid pressure, such as one hundred pounds per square inch, from a suitable fluid compressor not shown; and a manually operated brake valve 17 of well-known self-lapping type for controlling the fluid pressure in the control pipe 15.

The pressure chamber at one side of the usual piston in each brake cylinder 13 is connected to the control pipe 15 by a corresponding branch pipe 18 so that the fluid pressure in the brake cylinder 13 normally corresponds to the fluid pressure established in the control pipe 15.

The brake valve 17 has an operating handle 17a which is effective in its normal brake release position through the medium of a rotary operating shaft to condition the self-lapping mechanism of the brake valve 17 to exhaust fluid under pressure from the control pipe 15 through an exhaust port and pipe 19 to establish atmospheric pressure in the control pipe and correspondingly in the brake cylinders 13. When the brake valve handle 17a is shifted in a horizontal plane out of its normal release position into a so-called "application zone," the self-lapping mechanism of the brake valve is operated to cause fluid under pressure to be supplied from the main reservoir 16 to the control pipe 15, the fluid pressure established in the control pipe corresponding substantially to the degree of displacement of the brake valve handle 17a out of its brake release position. Thus, by shifting the brake valve handle 17a to different positions in the application zone having different degrees of displacement with respect to the release position thereof, the pressure in the control pipe 15 and in the brake cylinders 13 may be correspondingly controlled by the operator.

If the pressure in the control pipe 16 is reduced due to leakage or other causes referred to hereinafter, the self-lapping mechanism of the brake valve automatically operates to supply fluid under pressure to the control pipe to maintain a pressure therein corresponding to the position of the brake valve handle. This pressure maintaining feature should be borne in mind in connection with the subsequent description of the operation of the equipment.

According to our invention, there is interposed in the branch pipe 18 leading to the brake cylinder 13 for each wheel unit a double-beat magnet valve of suitable type which is controlled by a corresponding electrical apparatus 22 responsive to the rotative deceleration of the corresponding wheel unit at a slipping rate so as to release fluid under pressure from the associated brake cylinder 13 independently of the operator-controlled apparatus.

Figure 2:
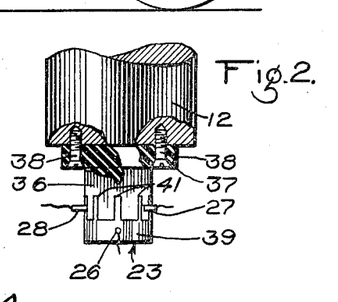
Fig. 2 is an enlarged fragmental view partly in section, showing details of construction of the commutator devices associated with the individual wheel units shown in Fig. 1.

The electrical apparatus 22 comprises a commutator device 23 secured to the end of the wheel axle 12 of each wheel unit in the manner shown in Fig. 2; an electrical condenser 24; a source of direct-current voltage, such as a storage battery 25; three contact fingers or brushes 26, 27 and 28; a condenser unit 29; a relay 31 of the polarized type; and a non-inductive resistor 32.

As will be apparent in Fig. 2, the commutator device 23 may comprise a base member 36, in the form of a solid cylinder of insulating material with a flange 37 at one end secured as by a plurality of screws 38 to the end of the axle 12 of a wheel unit in coaxial relation to the axle and rotatable therewith. The commutator device further comprises a ring 39 of suitable metal, such as copper, brass or alloys thereof, which is embedded in the outer end surface of the insulating base 36 or otherwise suitably affixed thereto. The ring 39 comprises a continuous portion having a plurality, illustratively shown as eight, contact fingers 41. The fingers 41 are of uniform width and spaced equal distances apart. The outer surface of the fingers 41 is flush with the outer surface of the intervening surface of the insulating base 36.

Figure 3:
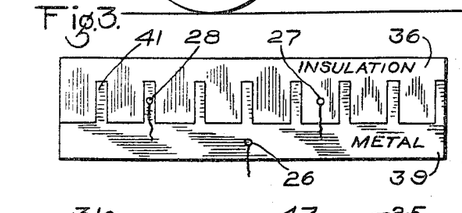
Fig. 3 is a diagrammatic view, showing a development of the commutator device in Fig. 2 and illustrating the relative positions of the brushes associated with the commutator device.

The brushes 26, 27 and 28 may be carried by a suitable brush holder in conventional manner, not shown, which is in turn supported from or secured to the inside of the axle journal. As indicated in Figs. 2 and 3, the brushes 27 and 28 are located in the same transverse plane in alignment with each other so as to engage the fingers 41 of the ring 39 whereas the brush 26 engages the continuous portion of the ring 39. For illustrative purposes, the brushes 27 and 28 are separated by an angle of approximately 157° although, as will hereinafter appear, any other suitable angular relation thereof for effecting the same result may be employed. The brush 26 is indicated as having a certain angular relation to the brushes 27 and 28 but, as will be apparent from subsequent description the angular position of this brush relative to brushes 27 and 28 is immaterial.

As indicated in Fig. 3, the angular spacing between the two brushes 27 and 28 is such that these brushes are alternately engaged by the contact fingers 41 of the ring 39 of the commutator device, as the base 36 is rotated on its axis. Thus, when the brush 28 engages a contact finger 41, as shown, the brush 27 is not engaged by a contact finger, and vice versa.

It will thus be understood that the commutator device 23 is effective, upon rotation, to alternately connect the brush 26 to the brushes 27 and 28.

As will be seen in Fig. 1, the brush 27 is connected by a wire 45 to one terminal of the battery 25, hereinafter taken to be the positive terminal, and that the brush 26 is connected to the opposite or negative terminal of the battery 25 by a wire 46 in which is interposed the condenser 24. The negative terminal of the battery 25 is grounded as at 47. Thus, when the commutator device 23 connects the brushes 26 and 27, a circuit is established for charging the condenser 24 to the voltage of the battery 25.

Connected between the brush 28 and ground at a point 48, is a circuit including two parallel branches, one of which includes the resistor 32 and the other of which includes the condenser unit 29 and the polarized relay 31 in series relation. Accordingly, when the commutator device 23 connects the brushes 26 and 28, the electrical charge stored in the condenser 24 is discharged through the resistor in the discharge circuit.

As in the copending sole application, Serial No. 342,935 of John Canetta mentioned above, the condenser 24 and its charging circuit are so designed as to have a "charging-time" constant that is small relative to the time of charging or the time that the charging circuit is closed. Accordingly, each time the charging circuit is established, the same quantity of electricity is stored in the condenser independently of the time of connection thereof to the battery 25, assuming the battery 25 to have a substantially constant voltage at all times. Suitable charging and voltage-regulating apparatus (not shown) may be provided for maintaining the voltage supplied by battery 25 at a constant value.

It will be apparent that the quantity of electricity so stored in condenser 24 will be a constant because the quantity Q of electricity, in coulombs, stored in a condenser is equal to the product of the capacitance C, which is a constant, of the condenser in farads and the voltage E impressed across the condenser. This may be expressed in the form of the following equation:

(1) $$Q=CE$$

If the nature of the discharge circuit were such that upon the establishment of the discharge circuit, the quantity Q of electricity stored in the condenser 24 were completely discharged then the alternate charging and discharging of the condenser repeatedly in rapid succession would produce a pulsating direct-current in the discharge circuit which would be directly proportional to the frequency or number of times per second that the discharge circuit is established.

As is well known, the unit of electrical current, the ampere, is the equivalent of a coulomb of electricity per second. Thus, the current in the discharge circuit in amperes would be theoretically equal to the quantity Q', in coulombs, discharged from the condenser 24 each time the discharge circuit is established multiplied by the frequency $f$ or the number of times the discharge circuit is established per second. This relation may be expressed mathematically by the equation:

(2) $$I=Q'f$$

It will be readily apparent from Equation 2 that assuming Q' to be a constant, the current I in the discharge circuit varies in direct proportion to the frequency $f$.

Obviously, the frequency of establishment of the discharge circuit depends not only upon the number of revolutions per second of the commutator device 23 but also on the number of contact fingers 41, which make and break the discharge circuit a corresponding number of times during each revolution. Thus the frequency may have any desired range by selecting a desired number of contact fingers 41 for the commutator device 23.

In actuality, the same quantity of electricity is not discharged from condenser 24 each time the discharge circuit therefor is established because of the variation in the voltage-drop across the resistor 32 with variation in the rotational speed of the commutator device 23. This will be apparent when, by analogy to Equation 1, it is understood that the quantity of electricity discharged from a condenser is equal to the capacitance of the condenser multiplied by the change in the voltage impressed on the condenser. Assuming that Q' is the quantity of electricity in coulombs discharged from a condenser, C is the capacitance of the condenser in farads, E is the initial voltage impressed on the condenser, and $E_1$ is the reduced voltage impressed on the condenser, the quantity of electricity discharged may be expressed mathematically by the equation:

(3) $$Q'=C(E-E_1)$$

Obviously, if the voltage on a condenser is reduced to zero, the quantity of electricity discharged from the condenser is equal to the entire quantity of electricity stored on the condenser. Similarly, if the voltage impressed on the condenser is reduced from a higher to some lower value, the quantity of electricity discharged from the condenser will be some fraction of the quantity stored on the condenser.

It will be further apparent that the polarity of the voltage-drop across the resistor 32 in the discharge circuit of the condenser 24 is such that the change in voltage on the condenser 24 during the establishment of its discharge circuit will be equal to the difference between the voltage to which the condenser 24 is charged just prior to the instant the discharge circuit is established and the voltage-drop across the resistor 32 while the discharge circuit is broken.

Now when it is considered that the current in the discharge circuit varies with the rotational speed of commutator device 23 and that the voltage-drop across the resistor 32 correspondingly varies with the rotational speed of the commutator device 23, it will be seen that in accordance with Equation 3, the variation of the voltage $E_1$ therein, which is equivalent to the voltage-drop across resistor 32, will result in a corresponding variation of the quantity $Q'$ of electricity discharged from the condenser 24 each time the discharge circuit is established. Thus, since the voltage-drop across the resistor 32, that is $E_1$, is low at low speeds and high at high speeds, it will be seen that the quantity $Q'$ of electricity discharged from condenser 24 each time the discharge circuit is established at a low speed will be greater than that discharged from the condenser 24 each time the discharge circuit is established at a high speed.

The current in the discharge circuit and consequently the voltage-drop across the resistor 32 is thus not directly proportional to the rotational speed of the vehicle wheel with which the commutator device 23 is associated when the source, corresponding to the storage battery 25, is of constant voltage. It will be apparent from Equation 3, however, that if the voltage of the source, which the battery 25 represents, is made relatively high in comparison to the voltage-drop across the resistor 32 at maximum vehicle speed, then the variation in the quantity of electricity discharged from the condenser 24 each time the discharge circuit is established at high and low speeds respectively will be a relatively low percentage. In such case, the current in the discharge circuit, and consequently the voltage-drop across the resistor 32, will approach closely to direct proportionality with the rotational speed of the commutator device.

The current in the discharge circuit may also be influenced somewhat by the time constant of the discharge circuit so that at the high speeds of vehicle travel it may be slightly less than would otherwise be the case. This effect can, however, be minimized by providing a discharge circuit having a low time constant.

The condenser unit 29 in the discharge circuit, being connected in parallel relation to the resistor 32 is charged to a voltage corresponding to the voltage-drop across the resistor 32 and stabilizes the fluctuations in the pulsating direct-current in the discharge circuit under normal conditions of wheel deceleration.

The condenser unit 29 functions also upon a reduction of the voltage across the resistor 32 occurring in response to deceleration of the wheels with which the commutator device 23 is associated to effect a discharge of current locally in the discharge circuit through the resistor 32 and the winding of the polarized relay 31. The current so discharged from condenser unit 29 will be equal to the product of the capacitance of the condenser unit and the change in voltage to which it is charged, that is, the change in voltage across the resistor 32. Since the amount of the change in the voltage across the condenser unit 29 occurring in a given time interval will vary in proportion to the rate of deceleration of the vehicle wheel unit, the current discharged from condenser unit 29 locally in the discharge circuit through the resistor 32 and the winding of relay 31 will correspond substantially to the rate of deceleration of the wheel unit.

The winding of the polarized relay 31 is so connected in the branch circuit with the condenser unit 29 that the flow of current through the winding thereof in a direction to charge the condenser 29 to the voltage across the resistor 32 when such voltage is increasing and the vehicle wheel unit correspondingly accelerating will be such as to bias the contact member of the relay 31 to its open position. Conversely, when the voltage across the resistor 32 decreases, in response to deceleration of the vehicle wheel unit, the direction of flow of current discharged from the condenser unit 29 through the winding of the polarized relay 31 is reversed and causes operation of the contact member of the relay to its closed position, if the current exceeds a certain value corresponding to a slipping rate of deceleration of the vehicle wheels. If the vehicle wheel unit decelerates at a non-slipping rate, the condenser unit 29 likewise discharges current corresponding to the deceleration rate through the winding of the polarized relay 31 but the current is of insufficient value to cause operation of the contact member thereof to its closed position.

If the voltage-drop across the resistor 32 were directly proportional at all times to the speed of rotation of the wheel unit, the current discharged from the condenser unit 29 would always be the same for a given rate of deceleration of the wheel unit regardless of whether the speed of rotation of the wheel unit is high or low. However, as previously explained, the voltage-drop across the resistor 32 is not directly proportional to the rotational speed of the vehicle wheel unit and thus the rate of reduction of the voltage across the resistor 32 and the voltage across the terminals of the condenser unit 29 will be greater at the lower speeds than at the higher speeds for a given rate of deceleration of the wheel unit. It will be apparent that this is so because, at the higher speeds, a greater change in speed must occur in a given length of time, such as one second, in order to effect the same reduction in voltage-drop across the resistor 32 and therefore the same reduction in voltage on condenser 29 as at the lower speeds.

It follows, therefore, that the contact member of the polarized relay 31 may be picked-up, for example, at a rate of rotative deceleration of the vehicle wheel unit of seven miles per hour per second at the lower speeds and at a rate of fifteen miles per hour per second at the higher speeds. However, since a rate of rotative deceleration of the vehicle wheel of seven miles per hour per second is never attained unless the vehicle wheel is slipping, the fact that the contact member of the polarized relay 31 will pick-up at different rates at the different speeds is not a practical difficulty because in no case will it pick-up unless the wheel is slipping. At the higher speed, the pick-up of the relay 31 is slightly delayed compared to low speeds.

If, as previously stated, the voltage of the source corresponding to the battery 25 is relatively high in comparison to the maximum voltage-drop across the resistor 32 so that the voltage-drop across the resistor 32 is almost directly proportional to the rotational speed of the vehicle wheel unit, then the percent variation in the rate of rotative deceleration of the vehicle wheel unit effective to cause pick-up of the contact member of the relay 31 at low speeds and at high speeds will be minimized. For example, the voltage of the source corresponding to the battery 25 may be such relative to the maximum voltage across the resistor 32 that the contact of the relay 31 will be operated to closed position in response to a rotative deceleration of the vehicle wheel unit at a rate exceeding ten miles per hour per second, at low speeds and at a rate of rotative deceleration exceeding eleven miles per hour per second at high speeds.

Although the above-described apparatus is similar to the apparatus provided in the above-mentioned Patent 2,270,413 of John Canetta, it should be noted that the apparatus of the patent is effective solely for detecting and registering the speed of rotation of a rotary element, such as a vehicle wheel, and is not effective to register the rate of change of speed, such as the rate of rotative deceleration, of a rotary element or vehicle wheel as is the apparatus which we have disclosed herein.

As is well understood by those skilled in the art, a polarized relay is of such nature that, once the contact member thereof is actuated to a given position in response to flow of current through the winding thereof in one direction, the contact member remains in such position until the direction of flow of current through the winding of the relay is reversed and exceeds a certain value. Thus when a wheel unit begins to slip, the contact member of the corresponding relay 31 is actuated to its closed position and remains in such position thereafter until the wheel unit begins to accelerate.

Each polarized relay 31 is arranged to control energization and deenergization of the magnet winding of the corresponding magnet valve device 21.

The source of current for energizing the winding of each magnet valve 21 may be any suitable source of direct-current such as a storage battery 51. The separate source 51 is provided for this purpose, rather than utilizing one of the sources 25, in order to avoid wide fluctuations in the terminal voltage E of the sources 25.

The magnet valves 21 are identical and of well-known construction and, accordingly, a brief description thereof is deemed sufficient. Each magnet valve 21 comprises a suitable casing in which is contained a double-beat valve 54 which is urged normally to an upper seated position by a coil spring 55 and which is actuated to a lower seated position in response to energization of a magnet winding 56. In its upper seated position, the double-beat valve 54 is effective to establish communication through the branch pipe 18 of control pipe 15 to the associated brake cylinder 13. In its lower seated position, the double-beat valve 54 closes the supply communication through the branch pipe 18 and establishes a communication through which fluid under pressure is exhausted from the brake cylinder 13 through an exhaust port 57 at a rapid rate.

*Operation of equipment shown in Fig. 1*

Let it be assumed that the vehicle having the equipment shown in Fig. 1 is traveling along the road under power with the reservoir 16 charged to the normal pressure carried therein, for example one hundred pounds per square inch, and that the brake valve handle 17a in its brake release position so that the control pipe pressure is at atmospheric pressure and the brakes correspondingly released. Since the vehicle is traveling at a constant speed, the contact member of each of the relays 31 is in the open position thereof and consequently the magnet winding of the magnet valves 21 are deenergized so that communication between the control pipe 15 and brake cylinders 13 is open through the respective branch pipes 18.

If now the operator desires to effect an application of the brakes he may do so, after first shutting-off the propulsion power, by shifting the brake valve handle 17a into the application zone an amount corresponding to the desired degree of application of the brakes. The control pipe 15 is correspondingly charged to a pressure such as, for example, twenty-five pounds per square inch corresponding to the degree of displacement to the brake valve handle out of its brake release position and since the magnet windings of the magnet valve 21 are deenergized, fluid at a corresponding pressure is supplied through the branch pipes 18 to the corresponding brake cylinders 18 associated with the respective wheel units. The brakes associated with the wheel units are accordingly applied in accordance with the degree of pressure established in the brake cylinders. As long as the magnet windings of the magnet valves 21 remain deenergized the operator of the vehicle may vary the pressure in the brake cylinder 13 and correspondingly the degree of application of the brakes associated with the wheels by varying or shifting the position of the brake valve handle.

If, during an application of the brakes or at the time that an application of the brakes is initiated, the wheels of a wheel unit begin to slip, further operation of the equipment occurs which will now be described. Let it be assumed that the left-hand wheel unit begins to slip. In such case, the contact member of the polarized relay 31 corresponding to such wheel unit is operated to its closed position to establish the circuit for energizing the magnet winding of the magnet valve 21 associated with the corresponding brake cylinder 13. The circuit for energizing the magnet winding of the magnet valve 21 is readily apparent from the drawing and needs no description.

Upon energization of its magnet winding the magnet valve 21 is operated to close communication through the branch pipe 18 to the corresponding brake cylinder and cause fluid under pressure to be rapidly exhausted from the brake cylinder. Accordingly, substantially at the instant that the wheels of a wheel unit begin to slip, fluid under pressure is rapidly vented from the corresponding brake cylinder 13 to cause a corresponding reduction in the degree of application of the brakes associated with the slipping wheel unit. As a result of the rapid reduction in the degree of application of the brakes associated therewith, the slipping wheels promptly cease to decelerate and begin to accelerate back toward a speed corresponding to vehicle speed without decelerating to a locked or non-rotative condition and sliding.

As previously stated, the contact member of the polarized relay 31 remains in its closed position, once it is actuated thereto, until the current reverses in the operating winding of the relay. Thus, once the circuit for energizing the magnet winding of the magnet valve 21 is completed, it remains established until such time as the slipping wheels begin to accelerate at a rate exceeding a certain rate sufficient to restore the contact member of the relay 31 to its open position.

Upon the restoration of the contact member of the relay 31 to its open position, the circuit for energizing the magnet winding of the magnet valve 21 is interrupted. The magnet valve 21 is thus restored to its normal position closing the exhaust communication and establishing the supply communication through the branch pipe 18 from the control pipe 15 to the brake cylinder 13.

The pressure in the control pipe 15 tends to reduce due to the supply of fluid under pressure to the vented brake cylinder 13. However, due to the pressure maintaining feature of the brake valve 17, previously mentioned, fluid under pressure is automatically supplied to the control pipe 15 to maintain a pressure therein corresponding to the position of the brake valve handle, notwithstanding the resupply of fluid under pressure to the brake cylinder 13. Thus, if the operator of the vehicle does not vary the position of the brake valve handle 17a, the fluid pressure restored in the brake cylinder 13 associated with the slipping wheel unit will be equivalent to the pressure established in the control pipe 15.

If the pressure restored in the brake cylinder 13 is effective to cause the wheel unit to again begin to slip, the above operation is repeated. Thus at no time are the wheels permitted to attain a locked or non-rotative condition and slide.

If the operator of the vehicle operates the brake valve 17 to reduce the degree of application of the brakes as the speed of the vehicle reduces, the fluid pressure reestablished in the brake cylinder associated with the slipping wheels will be correspondingly reduced and the likelihood of recurrence of wheel slipping lessened.

The contact member of the polarized relay 31 will ordinarily be restored to its open position, in response to the acceleration of the slipping wheels, before the vehicle comes to a stop so that the magnet valve 21 will be correspondingly restored to its normal position. If it should happen, however, that the contact member of the relay 31 remains in its closed position, at the time the vehicle comes to a stop, it will nevertheless be restored to its open position upon acceleration of the vehicle under propulsion power. Thus, the magnet valve 21 will always be properly conditioned to provide open communication through the branch pipes 18 to the brake cylinders 13 at the time an application of the brakes is initiated.

When a vehicle comes to a complete stop in response to an application of the brakes, the operator may vary the pressure in the brake cylinders 13 as desired to secure any necessary degree of braking to hold the vehicle on a grade. Before starting the vehicle again, the operator may release the brakes simply by restoring the brake valve handle 17a to its brake release position in which position the fluid under pressure in the brake cylinders 13 is vented to atmosphere along with the fluid under pressure in the control pipe 15 through the exhaust port 19 of the brake valve.

Figure 4:
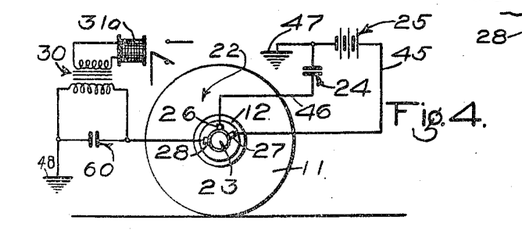
Fig. 4 is a fragmental diagrammatic view, showing a modification of the apparatus in Fig. 1.

*Equipment shown in Fig. 4*

The equipment shown in Fig. 4 shows a modification of the arrangement shown in Fig. 1 and, being generally similar to the equipment shown in Fig. 1, the corresponding parts in the two equipments are designated by the same reference numerals without further description. Only so much of the equipment shown in Fig. 4 that differs from that in Fig. 1 will accordingly be described.

The equipment shown in Fig. 4 differs from that in Fig. 1 with respect to the discharge circuit associated with brush 28 of the commutator device 23. A transformer 30 is provided having a primary winding connected in the discharge circuit between the brush 28 and the ground connection 48 and having the terminals of the secondary winding thereof connected to the winding of a polarized relay 31a similar to the relay 31. The contact member of the relay 31a is arranged to control the circuit for energizing the magnet winding of the magnet valve 21 (not shown), as indicated in Fig. 1.

A condenser 60 is connected in parallel relation with the primary winding of the transformer 30 for the purpose of smoothing out the fluctuating direct-current in the discharge circuit, which current varies substantially in proportion to the rotational speed of the wheels 11, as in Fig. 1.

When the speed of rotation of the wheels 11 changes, the current energizing the primary winding of transformer 30 changes at a corresponding rate. The magnetic flux coupling the primary and secondary windings of the transformer correspondingly reduces or increases at a corresponding rate and a voltage is thus induced in the secondary winding of the transformer which is proportional to the rate of change of current in the primary winding. Since the rate of change of current in the primary winding is proportional substantially to the rate of rotative deceleration or acceleration of the wheels, the voltage induced in the secondary winding of the transformer will likewise be substantially proportional to the rate of rotative deceleration or acceleration of the wheels. It will be apparent that the voltage induced in the secondary winding is of one polarity when the wheels decelerate and of the opposite polarity when the wheels accelerate.

The windings of the transformer 30 and the operating winding of the polarized relay 31a are so designed and arranged that the voltage induced in the secondary winding of the transformer will cause energization of the winding of the relay 31a to a sufficient degree to cause operation of the contact member thereof from its open to its closed position only in response to the rotative deceleration of the wheels 11 at a rate exceeding a certain slipping rate. The operation of the contact member of the relay 31a in response to slipping of the wheels effects operation of the magnet valve 21 associated therewith to cause fluid under pressure to be released at a rapid rate from the associated brake cylinder.

It will be understood that the normal fluctuations of the direct-current in the primary winding of the transformer when the wheels are rotating at a constant speed are effective to produce an alternating current of a corresponding frequency in the secondary winding of the transformer. The purpose of the condenser 60 is to prevent the variation of the current in the primary winding at a sufficient rate normally that the voltage induced in the secondary winding will cause pick-up of the relay 31a. The capacitance of the condenser 60 is insufficient to interfere with the reduction of current in the primary winding at a sufficient rate to cause pick-up of the relay 31a in response to slipping of the wheels 11. If the number of contact fingers 41 on the commutator device 23 is large so that the frequency of charge and discharge of the condenser 24 is high, then condenser 60 may be omitted because the pulsations of the direct-current in the discharge circuit will then be less likely to produce an undesired pick-up of the relay 31a. The condenser 60 may likewise be omitted if the relay 31a is made to be slow-acting. If relay 31a is slow-acting it will respond to a continued rapid reduction of the current in the discharge circuit occurring only when the wheels slip but not to the normal fluctuating changes in current in the discharge circuit during normal operation.

When the pressure of the fluid in the brake cylinder associated with the slipping wheels is reduced sufficiently, the wheels cease to decelerate and begin to accelerate back to a speed corresponding to car speed. Acceleration of the wheels causes an increase of the current in the discharge circuit including the primary winding of the transformer 30 and consequently a voltage of reverse polarity is induced in the secondary winding. Such reversal of polarity of voltage induced in the secondary winding of the transformer causes the contact member of the relay 31a to be restored to its open position interrupting the circuit for energizing the magnet winding of the magnet valve 21. The magnet valve is accordingly restored to its normal position closing the exhaust communication from the brake cylinder and reestablishing the supply communication thereto.

In view of the complete description of the equipment shown in Fig. 1, it is believed unnecessary to further describe the equipment shown in Fig. 4.

Figure 5:
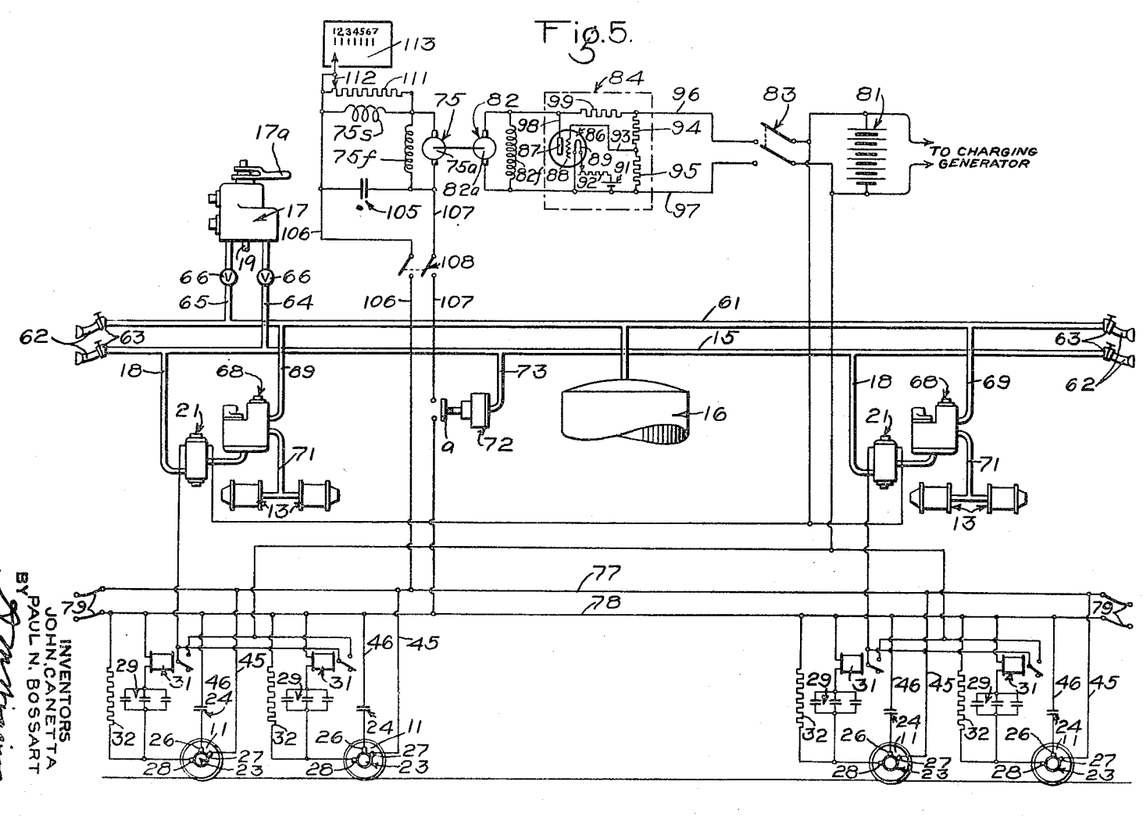
Fig. 5 is a diagrammatic view, showing another modification of the apparatus in Fig. 1, and adapted for operation in connection with a single railway car or a train of cars.

Equipment shown in Fig. 5

The equipment shown in Fig. 1 is satisfactory for a single rotary element or a limited number of rotary elements, such as the wheels of a single car, but does not lend itself in a practical manner to a brake control equipment for a train of cars. It will be apparent that the provision of a separate storage battery 25 for each wheel unit of train of cars would necessitate a large number of storage batteries, the initial cost, as well as service and maintenance cost, of which would present practical difficulties.

We have accordingly provided the brake control equipment shown in Fig. 5 to illustrate the application of our invention in a practical manner to a brake control equipment for a train of cars. The equipment shown in Fig. 5 differs from that shown in Fig. 1 in providing a single voltage source in the form of a generator 75 to act as the voltage source for all of the wheel units on a train of cars in place of a large number of separate batteries 25.

The generator 75 is adapted to be driven at a constant speed in the manner presently to be described and provides a voltage which, as distinguished from the constant voltage of the batteries 25, varies with the speed of travel of the train. As will be explained more fully hereinafter, the generator 75 is a compound-wound generator of the direct-current type having an over-compounded voltage characteristic so that the terminal voltage of the generator varies in proportion to the total current supplied thereby to the separate commutator devices 23 associated with the respective wheel units, which current in turn varies in accordance with the speed of travel of the train.

The purpose of providing a generator with an over-compounded voltage characteristic is to secure a more uniform pick-up point for the relay 31 over a wide range of variation of train speed.

It will be recalled that in the equipment shown in Fig. 1, the relays 31 are not picked-up at exactly the same rate of rotative deceleration of a corresponding wheel unit because the quantity Q of electricity discharged from the condenser 24 when the discharge circuit is established is higher at low speeds than it is at high speeds, thereby causing variation in the voltage-drop across the resistor 32 which is not directly proportional to the rotational speed of the wheels. By so designing the generator 75 that the increase in the terminal voltage of the generator under load conditions over the no-load voltage thereof is substantially equal to the voltage-drop across the resistor 32 at any given speed, it will be seen that the amount of reduction in voltage impressed on the condenser 24 each time the discharge circuit therefor is established will be a constant.

In other words if E represents the no-load voltage of the generator and e the increment of increase of terminal voltage of the generator under load conditions for a given voltage-drop e across resistor 32, the amount of change D in voltage on the condenser 24 each time the discharge circuit therefor is established may be expressed mathematically as follows:

(4) $$D=(E+e)-e=E$$

That is, the amount of change of the voltage impressed on condenser 24 each time the discharge circuit therefor is established is a constant.

By reference to Equation 3, it will thus be seen that the quantity Q' of electricity discharged from the condenser each time the discharge circuit therefor is established will be substantially constant and, therefore, as previously explained, the current in the discharge circuit will be theoretically directly proportional at all times to the rotational speed of the wheel unit.

In the case of a single rotary element, having a voltage source in the form of an over-compounded generator, the amount of the reduction in the voltage-drop across the resistor 32 and that across the condenser unit 29 effected in a given interval of time when the wheel unit is decelerating will thus be substantially constant for a given rate of deceleration. Accordingly, the current discharged from the condenser unit 29 locally in the discharge circuit through the winding of the relay 31, upon deceleration of the wheel unit will be substantially the same for a given rate of deceleration regardless of whether the speed of rotation of the wheel unit is high or low. In such case, therefore, the relay 31 in the discharge circuit will be picked-up at substantially the same rate of rotative deceleration of the wheel unit whether the speed of rotation of the wheel unit is high or low.

In the equipment shown in Fig. 5, wherein the condensers 24 associated with a large number of wheel units are charged by the generator 75, the terminal voltage of the generator will vary in accordance with the charging current which is in turn proportional to the speed of the train. Thus, if an individual wheel unit begins to slip, the voltage to which the condenser 24 in the charging circuit of the corresponding wheel unit is charged is not reduced in accordance with the speed of the slipping wheel. The reduction in the voltage impressed on the condenser 24 associated with a slipping wheel when the discharge circuit therefor is established accordingly increases somewhat with the reduction in speed of the slipping wheel because of the greater reduction in the voltage-drop across resistor 32 in comparison to the drop in voltage of the generator. The quantity of electricity discharged from such condenser 24, each time the discharge circuit therefor is established, accordingly does not remain exactly constant but increases slightly. However, since the voltage supplied by the generator 75 is adjusted initially in accordance with the speed of the vehicle, the variation from a constant value of the quantity of electricity discharged from the condenser each time the discharge circuit is established will be less than in the case of a constant voltage source.

It follows, therefore, that while the voltage-drop across the resistor 32 associated with a slipping wheel is not exactly proportional to the speed of rotation of the slipping wheel, it will be more nearly so than in the case of a constant voltage source. Accordingly, the current discharged from the condenser unit 29 locally through the winding of the relay 31 upon the slipping of an individual wheel unit will be more nearly uniform for a given rate of deceleration than in the case of a constant voltage source.

As previously indicated with respect to the embodiment shown in Fig. 1, the current in the discharge circuit of each condenser 24 of the embodiment shown in Fig. 5 may tend to be somewhat reduced at high vehicle speeds due to the influence of the time constant of the discharge circuit. This effect can be approximately compensated for by the proper over-compounding of generator 75.

Considering the equipment shown in Fig. 5 in detail, it will be seen that the equipment shown is for a single railway car having two four-wheel trucks located respectively at opposite ends of the car, only one wheel of each wheel unit being shown.

The pneumatic apparatus whereby the operator controls the supply and release of fluid under pressure to and from the brake cylinders 13 differs somewhat from that shown in Fig. 1 and will be briefly described. As in Fig. 1, the main reservoir 16 is provided but the reservoir is located at the center of the car and is constantly connected to a train pipe, hereinafter called the supply pipe 61. A brake valve 17 of the self-lapping type is provided for controlling the pressure in a control pipe 15 just as in Fig. 1. The two pipes 15 and 61 extend from end to end of the car and are provided with suitable hose couplings 62 and angle cocks 63 in conventional manner whereby to connect the sections of these pipes on successive cars. Connections are established between the brake valve 17 and the pipes 15 and 61 respectively by branch pipes 64 and 65 in which are interposed manually operated valves 66. Valves 66 are turned to open position when it is desired to control the pressure in the control pipe 15 from the brake valve 17 on the corresponding car. When it is desired to control the pressure in the control pipe 15 by a brake valve located on another car, not shown, the valves 66 in both branch pipes 64 and 65 are closed thus rendering the brake valve 17 on the shown car non-operative.

Instead of providing an individual communication between each brake cylinder and the control pipe 15 as in Fig. 1, the brake cylinders for each truck are controlled by a relay valve device 68, of well-known construction, which is in turn controlled according to the fluid pressure in control pipe 15 supplied thereto through a branch pipe 18 of pipe 15 under the control of a magnet valve 21.

The relay valve 68 is of a super-sensitive high capacity type and is arranged to supply fluid under pressure from the supply pipe 61, to which it is connected by a branch pipe 69, to the brake cylinders 13 through a brake cylinder pipe 71 in response to the operating fluid pressure supplied to the pressure chamber thereof through the branch pipe 18 from the control pipe 15. When the pressure in the control pipe 15 is at atmospheric pressure the relay valve device 68 causes fluid under pressure to be exhausted to atmosphere through an exhaust port thereof. When fluid under pressure is supplied from the control pipe 15 to the pressure chamber of the relay valve device 68, the relay valve device operates to cause fluid under pressure to be supplied from the supply pipe 61 to the brake cylinders 13 and establishes a pressure therein corresponding to the pressure established in the control pipe 15.

A pressure operated switch 72, preferably of the snap-acting type, is connected by a branch pipe 73 to the control pipe 15 and is operatively controlled by the pressure therein. Any suitable type of pressure operated switch may be provided. As diagrammatically shown, the pressure switch 72 comprises a contact member $a$ which is adapted to be snapped out of engagement with a pair of associated stationary contact members when the pressure in the control pipe 15 is reduced below a certain low pressure, such as five pounds per square inch. When the pressure in the control pipe increases above such pressure, the contact member $a$ of the pressure switch 72 is snapped into contact with its associated pair of contact members. The function of the pressure switch 72 will be explained hereinafter.

As in Fig. 1, each wheel unit of the equipment in Fig. 5 is provided with an axle-driven commutator device 23 for alternately establishing a charging circuit for a condenser 24 and a discharge circuit including a resistor 32, a condenser unit 29, and a polarized relay 31. Instead of providing a separate battery source, such as the storage battery 25, in each condenser charging circuit for each wheel unit, the equipment shown in Fig. 5 provides a single source of direct-current potential, in the form of the compound-wound generator 75 previously mentioned, the terminal voltage of which is impressed on a pair of train wires 77 and 78. The train wires 77 and 78 extend from end to end of the car and are provided with suitable couplers 79 whereby the sections of the train wires on successive cars may be connected.

The brush 27 associated with the commutator device 23 of each wheel unit is connected by a wire 45 to the train wire 77 which will hereinafter be referred to as the positive train wire. The brush 26 associated with the commutator device 23 of each wheel unit is connected by a wire 46 to the train wire 78, the condenser 24 being interposed in the wire 46. The train wire 78 will hereinafter be referred to as the negative train wire.

The discharge circuit including the parallel-connected resistor 32 and series-related condenser unit 29 and polarized relay 31 are connected in a circuit between the brush 28 associated with each commutator device 23 of each wheel unit and the negative train wire 78.

The contact members of the two polarized relays 31 for each wheel truck are arranged in parallel relation so that the operation of either relay, effected in response to slipping of the corresponding wheel unit, may establish a circuit for energizing the magnet winding of the magnet valve 21 for the corresponding truck.

The source of current for energizing the magnet windings of the magnet valves 21 on each car is a storage battery 81 which is indicated as being the usual car lighting battery. As indicated by the legend in Fig. 5, the storage battery 81 is adapted to be maintained fully charged by a charging generator and apparatus in the usual manner.

The generator 75 is driven by a motor 82 of the shunt wound direct-current type. Motor 82 is operated by current supplied from the storage battery 81, a knife switch 83 being provided for controlling the circuit connections between the motor 82 and the battery 81.

In order to supply a substantially constant battery voltage to the motor 82, a voltage-regulator 84, of suitable type, is provided. The voltage-regulator shown in Fig. 5 is of the type shown and described on page 98 of the October 1923 issue of the Bell System Technical Journal and is accordingly not our invention.

Briefly, the voltage regulator 84 comprises a vacuum tube of the three electrode type having a plate 87, grid 88 and filament 89.

The filament 89 is heated by current supplied from a suitable source, such as a battery 91, and the current through the filament is controlled by a suitable rheostat 92.

The grid 88 is connected by a wire 93 to an intermediate point of connection between two resistors 94 and 95 the outer ends of which are connected respectively to wires 96 and 97 connecting the motor 82 to the battery 81.

The plate 87 is connected by a wire 98 to the wire 96. A third resistor 99 is interposed in the wire 96 between the respective points of connection thereto of the plate 87 and of the resistor 94.

In operation, an increase of the battery voltage raises the grid potential, thereby increasing the current through the tube and the resistor 99. Assuming the resistances of the resistors 95, 94 and 99 to be $r_1$, $r_2$ and $r_3$ respectively, and the mutual conductance of the tube 86 to be $g$, it may be readily shown that by such choice of resistance and tube that $$(5) \qquad r_3 = \frac{r_1 + r_2}{r_1 g}$$

The voltage impressed on the terminals of the motor 82 will be constant.

A voltage-regulator of the type described is adapted to maintain a substantially constant voltage supply over a wide range of variation of battery voltage. Thus, notwithstanding variations of the terminal voltage of the battery 81, the voltage impressed across the terminals of the motor 82 will remain substantially constant and the motor will therefore operate at a substantially constant speed.

The motor 82 comprises a rotary armature winding 82a and a shunt field winding 82f. As is well known, the shunt motor has a relatively flat or constant speed characteristic over a relatively wide range of load current.

The generator 75 comprises an armature winding 75a, a shunt field winding 75f, and a series field winding 75s. As shown, the shunt field winding 75f is connected directly across the brush terminals of the armature winding 75a so that the generator is what is commonly known as "short shunt connected."

An electrical condenser 105 is connected between the output terminals of the generator 75, that is between one brush terminal of the armature winding 75a and the outer terminal of the series field winding 75s for the purpose of absorbing minor fluctuations in the output voltage of the generator due to the fluctuating current supplied to charge the condensers 24 associated with the different wheel units. Current is supplied from the output terminals of the generator 75 to the train wires 77 and 78 by branch wires 106 and 107 respectively. A double pole knife switch 108 is provided for the purpose of interrupting the connections between the output terminals of the generator 75 and the train wires 77 and 78 when desired.

In one of the branch wires, for example the wire 107, is interposed the pressure switch 72. Since the pressure switch 72 is operated to closed position only upon an application of the brakes, it will be seen that when the vehicle is traveling along the road with the brakes released, no current is supplied from the generator 75 to the charging circuit associated with each wheel unit. Accordingly the generator 75 is driven at "no-load" when the vehicle is traveling along the road under power with the brakes released.

The relation and design of the field windings 75f and 75s of the generator 75 are such as to obtain an over-compounded voltage characteristic so that the terminal voltage of generator 75 impressed on train wires 77 and 78 increases and decreases as the speed of the car or train increases and decreases, respectively.

It will be apparent that the current supplied to charge the condensers 24 varies in direct proportion to the frequency of establishment of the charging circuits therefor, and thus according to the speed of travel of the car or train. Accordingly since the load current of generator 75 flowing through the series field winding 75s varies with the speed of travel of the car or train, the compounding of the generator may be so designed that the degree of increase in terminal voltage of the generator over the no-load voltage thereof will vary with the speed in unison with the variation in the voltage-drop across resistor 32 in each of the discharge circuits, as previously pointed out in connection with Equation 4.

For reasons previously explained in connection with the equipment shown in Fig. 1, the voltage supplied by the generator is preferably relatively high compared to the voltage drop across resistors 32. The no-load terminal voltage of generator 75 may, therefore, be of the order of five hundred volts and the maximum voltage-drop across the resistors 32 of the order of fifty volts.

When a plurality of cars are connected together in a train, only one motor-generator equipment need be connected to the train wires 77 and 78, the motor-generator equipments on other cars being cut-out of operation by means of the knife switches 83 and 108. It is desirable to have only one motor-generator equipment in operation at one time because of the difficulty of operating a plurality of generators in parallel relation. Obviously, in the case of modern high speed passenger trains in which the cars and power-unit remain coupled and do not travel as single cars, there is no need to provide a motor-generator set on more than one car. This one car may be and preferably is the power car.

It will be understood, therefore, that the greater the number of cars connected together, the greater is the current load of the generator 75 connected to the train wires 77 and 78. It is accordingly necessary to vary the degree of compounding of the generator 75 in accordance with the number of cars in a train. To accomplish this, a diverter or resistor 111 is connected in shunt relation to the series field winding 75s of the generator 75 and a movable contact arm 112 is shifted to different positions thereon in correspondence with the number of cars in the train as indicated by the scale 113. It will be seen that with only one car in use, a maximum amount of the resistor 111 is connected in parallel relation to series field winding 75s, thus diverting a minimum percentage of current from the series field winding. As the number of cars in the train increases, the contact arm 112 is positioned correspondingly to reduce the amount of the resistor 111 in parallel relation to the series field winding 75s so that the percentage of current diverted from the series field winding 75s increases correspondingly with the increase in the number of cars in the train. It will be seen that by suitably adjusting the position of the contact arm 112 in accordance with the number of cars in the train, at the time the train is made up, a substantially uniform overcompounded voltage characteristic of the generator 75 relative to the speeds of the train may be obtained, notwithstanding variation in the number of cars in the train.

In view of the description of the equipment shown in Fig. 1, it is believed that the operation of the equipment shown in Fig. 5 will be readily understood from the above description of the parts of the equipment without any further specific description of the operation.

Summary

Summarizing, it will be seen that we have disclosed several embodiments of vehicle brake control apparatus including a novel electrical device responsive to the rate of rotative deceleration of a wheel or wheel unit of the vehicle for controlling the degree of the brake application and particularly adapted to be responsive to the deceleration of an individual wheel or wheel unit of the vehicle at a slipping rate for effecting a rapid release of the brakes associated with the slipping wheels to prevent the sliding thereof.

The electrical device responsive to the rate of rotative deceleration of a vehicle wheel comprises a commutator or rotary switch device operated in accordance with the rotational speed of the vehicle wheel for alternately charging a condenser to the voltage of a voltage-source and discharging it into a discharge circuit at a frequency proportional to the rotational speed of the vehicle wheel. Another condenser of relatively large capacity with respect to the first condenser is connected in the discharge circuit in such a manner as to cause a local discharge of current therefrom through the winding of a relay substantially in accordance with the rate of deceleration of the vehicle wheel. The relay is adapted to be picked up only in response to a current exceeding a certain value and corresponding to a certain rate of rotative deceleration of the vehicle wheel unit occurring only when the wheel unit slips for effecting the rapid release of the brakes associated with the vehicle wheel.

In one embodiment, the primary winding of a transformer is connected in the discharge circuit associated with the commutator device while the secondary winding of the transformer is connected to the operating winding of the relay. In this case, the reduction of the current in the discharge circuit in accordance with the reduction in the speed of the vehicle unit at a slipping rate causes a sufficient voltage to be induced in the secondary winding of the transformer to cause pick-up of the relay and a consequent rapid release of the brakes.

In another embodiment, a single voltage source, in the form of an over-compounded generator driven at a constant speed, is provided instead of a plurality of separate sources, such as storage batteries, for supplying current to charge the condensers associated with all the separate wheel units of a car or train. Thus instead of charging the condensers associated with the commutator devices to a constant voltage each time the charging circuit therefor is established, the voltage varies with the speed of travel of the car. This arrangement enables the pick-up operation of the relays for effecting the rapid release of the brakes on a slipping wheel more nearly at the same slipping rate of deceleration, over a wide range of car speed, than the other embodiments.

The last described embodiment is particularly adapted for operation in connection with a train of cars. Since the current load on the generator varies with the number of cars, a diverter or resistor is connected in shunt relation to the series field winding of the generator and adjusted to different positions according to the number of cars in the train so that notwithstanding the variation in the current load of the generator in accordance with the number of cars, a substantially uniform over-compounded voltage characteristic relative to train speed is obtained.

It will be understood that the electrical apparatus responsive to the rate of change of speed of a vehicle wheel or wheel unit may be employed in other situations than brake control equipment for registering the rate of change of speed of any rotary element. Accordingly, while we have shown and described several embodiments of our invention particularly as embodied in connection with vehicle brake control equipment, it will be apparent that various omissions, additions, and modifications may be made in the embodiments shown without departing from the spirit of our invention. It is accordingly not our intention to limit the scope of our invention except in accordance with the terms of the appended claims.

Having now described our invention, what we claim as new and desire to secure by Letters Patent, is:

1. Apparatus for detecting the rate of rotative deceleration of a rotary element comprising, in combination, a source of direct-current voltage, an electrical condenser, a discharge circuit including a resistor and a second electrical condenser in parallel with said resistor, means effective to cause the first said condenser to be alternately charged to the voltage of said source and discharged into said discharge circuit at a frequency proportional to the rotational speed of the rotary element to cause a direct-current to flow in the discharge circuit and to cause the said second condenser to be charged to a voltage corresponding to the voltage-drop across said resistor and substantially proportional to the rotational speed of the rotary element, said second condenser being effective to discharge current locally in the discharge circuit through said resistor substantially proportional to the rate of reduction of the voltage-drop across said resistor, and means responsive to a current discharged from said second condenser in the discharge circuit exceeding a certain value and corresponding to a certain rate of rotative deceleration of the rotary element.

2. Apparatus for detecting the rate of rotative deceleration of a rotary element comprising, in combination, a source of direct-current voltage, an electrical condenser, a discharge circuit including a resistor and a second electrical condenser in parallel relation with said resistor, means effective to cause the first said condenser to be alternately charged to the voltage of said source and discharged into said discharge circuit at a frequency proportional to the rotational speed of the rotary element to cause a direct-current to flow in the discharge circuit such that the voltage to which the said second condenser is charged and corresponding to the voltage-drop across said resistor is substantially proportional to the rotational speed of the rotary element, a polarized relay having an operating winding connected in series relation with the said second condenser in parallel with said resistor, the winding of the said relay being so connected that, upon an increase in the voltage-drop across said resistor, the charging current of said second condenser flows through the winding in one direction and causes said relay to be operated to a normal position and, upon a decrease in the voltage-drop across said resistor, the current discharged from said second condenser flows through the operating winding of the relay in the opposite direction and causes the relay to be actuated to an operative position only when the current discharged from the said second condenser exceeds a certain value corresponding to a certain rate of rotative deceleration of the rotary element.

3. Apparatus for detecting the rate of rotative deceleration of a rotary element comprising, in combination, a source of substantially constant direct-current voltage, an electrical condenser, a discharge circuit for said condenser including a resistor and a second condenser in parallel relation with said resistor, means effective to cause said first condenser to be alternately charged to the voltage of said source and discharged into said discharge circuit at a frequency proportional to the rotational speed of said rotary element to cause a flow of direct-current in the discharge circuit to produce a voltage-drop across said resistor varying substantially in proportion to the rotational speed of the rotary element and correspondingly charging said second condenser to said voltage, said second condenser being effective to discharge a current locally in the discharge circuit substantially in accordance with the rate of reduction of the voltage-drop across said resistor and therefore in accordance with the rate of rotative deceleration of the rotary element, and current-responsive means responsive to a current so discharged from said second condenser exceeding a certain value and corresponding to rotative deceleration of the rotary element at a rate exceeding a certain rate.

4. Apparatus for detecting the rate of change of speed of a rotary element comprising, in combination, an over-compounded generator of the direct-current type, an electrical condenser, a discharge circuit for said condenser including a resistor, means effective to cause said condenser to be alternately charged to the voltage delivered by said generator and discharged into said discharge circuit at a frequency proportional to the rotational speed of said rotary element, said generator supplying a voltage varying with the frequency of the charging of said condenser so that a substantially constant quantity of electricity is discharged through the discharge circuit each time it is established thereby causing a flow of direct-current in the discharge circuit which is substantially proportional to the rotational speed of the rotary element, and means responsive to the rate of change in the voltage-drop across the resistor in the discharge circuit for registering the corresponding rate of change of rotational speed of the rotary element.

5. Apparatus for detecting the rate of change of speed of a rotary element comprising, in combination, an over-compounded generator of the direct-current type, an electrical condenser, a discharge circuit for said condenser including a resistor, means effective to cause said condenser to be alternately charged to the voltage delivered by said generator and discharged into said discharge circuit at a frequency proportional to the rotational speed of said rotary element, said generator supplying a voltage varying with the frequency of the charging of said condenser so that a substantially constant quantity of electricity is discharged through the discharge circuit each time it is established thereby causing a flow of direct-current in the discharge circuit which is substantially proportional to the rotational speed of the rotary element, and a second condenser connected in parallel relation to said resistor in the discharge circuit adapted to be charged to a voltage corresponding to the voltage-drop across said resistor and effective upon a reduction of the voltage across said resistor to discharge current locally in said discharge circuit substantially proportional to the rate of reduction of the voltage across the resistor which is in turn substantially proportional to the rate of rotative deceleration of said rotary element, and current-responsive means operatively responsive only to a current so discharged from said second condenser exceeding a certain value and corresponding to rotative deceleration of the rotary element at a rate exceeding a certain rate.

6. Apparatus for detecting the rate of rotational deceleration of a rotary element comprising, in combination, a compound-wound generator of the direct-current type adapted to produce an over-compounded voltage characteristic, means for driving said generator at a substantially constant speed, an electrical condenser, a discharge circuit for said condenser including a resistor and a second electrical condenser in parallel with said resistor, means effective to cause the first said condenser to be alternately charged to the voltage delivered by said generator and discharged into said discharge circuit at a frequency proportional to the rotational speed of the rotary element to cause a direct-current to flow in the discharge circuit, said generator being effective to deliver a voltage which varies according to the current supplied thereby to charge the first said condenser substantially in unison with the variation in the voltage-drop across the resistor in said discharge circuit, the quantity of electricity discharged from the first said condenser each time the discharge circuit is established being substantially constant notwithstanding the variation in speed of rotation of the rotary element so that the direct-current in the discharge circuit is substantially proportional to the rotational speed of the rotary element, said second condenser being effective upon a reduction in the voltage across the resistor in the discharge circuit for discharging current locally in the discharge circuit substantially proportional to the rate of reduction of the voltage across the resistor and accordingly substantially proportional to the rate of rotative deceleration of the rotary element, and means responsive to the current so discharged from said second condenser.

7. Apparatus for severally detecting the rate of change of speed of a plurality of separately rotatable rotary elements comprising, in combination, a compound-wound generator of the direct-current type having an over-compounded voltage characteristic, an electrical condenser for each of said rotary elements, a discharge circuit including a resistor for each of said condensers respectively, means for each rotary element effective to cause the corresponding condenser to be alternately charged to the voltage delivered by said generator and discharged into the corresponding discharge circuit at a frequency proportional to the rotational speed of the corresponding rotary element to cause a direct-current to flow in the discharge circuit, the voltage-characteristic of said generator being such that the terminal voltage under load conditions exceeds the no-load voltage by an amount corresponding to the voltage-drop across the resistor in the discharge circuit for each rotary element and varies in response to variation of the current supplied to charge said plurality of condensers, the charging current for each of said condensers being in turn proportional to the rotational speed of the corresponding rotary element, each of said condensers being effective correspondingly to discharge substantially the same quantity of electricity each time the discharge circuit therefor is established so that the direct-current flowing in the discharge circuit for each condenser is substantially proportional at all times to the rotational speed of the corresponding rotary element, and individual means for the discharge circuit of each condenser responsive to the rate of change of current in the corresponding circuit.

8. Apparatus for detecting the rate of rotational deceleration of a rotary element comprising, in combination, a compound-wound generator of the direct-current type having an over-compounded voltage characteristic, a motor for driving said generator having a substantially constant-speed characteristic over a wide range of load variation for a constant impressed voltage, a fluctuating source of voltage, a voltage-regulator for causing a substantially constant voltage to be impressed on the motor from said source, an electrical condenser, a discharge circuit for said condenser including a resistor, means effective to cause said condenser to be alternately charged to the voltage delivered by said generator and discharged into said discharge circuit at a frequency proportional to the rotational speed of the rotary element to cause a direct-current to flow in the discharge circuit, said generator being effective to deliver a voltage which varies according to the current supplied thereby to charge said condenser and substantially in unison with the variation in the voltage-drop across the resistor in said discharge circuit, the quantity of electricity discharged from said condenser each time the discharge circuit therefor is established being thus substantially constant notwithstanding the variation in speed of rotation of the rotary element so that the direct-current in the discharge circuit is substantially proportional to the rotational speed of the rotary element, and means operatively responsive to the rate of change of voltage across the resistor in said discharge circuit.

9. Apparatus for severally detecting the rate of change of speed of a plurality of separately rotatable rotary elements comprising, in combination, a compound generator of the direct-current type driven at a substantially constant speed, said generator having a series field winding and a shunt field winding so designed and constructed that the generator has an over-compounded voltage-characteristic variable according to the variation of current energizing the series field winding, an electrical condenser for each of said rotary elements, a discharge circuit including a resistor for each of said condensers respectively, individual means associated with each rotary element respectively effective to cause the corresponding condenser to be alternately charged to the voltage delivered by said generator and discharged into the corresponding discharge circuit at a frequency proportional to the rotational speed of the corresponding rotary element to cause a direct-current to flow in the corresponding discharge circuit, means associated with the series field winding of said generator for so controlling the amount of current therethrough in proportion to the number of condensers charged by said generator as to cause the generator to produce a substantially uniform over-compounded voltage-characteristic relative to the rotational speed of said rotary elements whatever the number of condensers charged by said generator, the voltage-characteristic of the generator being such that the voltage delivered by the generator under load exceeds the no-load voltage thereof by an amount corresponding to the voltage-drop across the resistor of the discharge circuit of each rotary element, each condenser being effective correspondingly to discharge substantially the same quantity of electricity each time the discharge circuit therefor is established so that the direct-current flowing in the discharge circuit for each condenser is substantially proportional to the rotational speed of the corresponding rotary element notwithstanding a wide variation in the speed of the corresponding rotary element, and individual means for the discharge circuit of each condenser operatively responsive to the rate of change of current in the corresponding circuit.

JOHN CANETTA.
PAUL N. BOSSART.